MULTIPLE MATCH RESOLVING NETWORK

Filed Feb. 19, 1968 5 Sheets-Sheet 1

INVENTORS:
Richard M. Bird
Ju C. Tu
By Joseph Dwyer
ATTORNEY

INVENTORS:
Richard M. Bird
Ju C. Tu
By Joseph R. Dwyer
ATTORNEY

MULTIPLE MATCH RESOLVING NETWORK

Filed Feb. 19, 1968 5 Sheets-Sheet 3

INVENTORS:
Richard M. Bird
Ju C. Tu
By Joseph A. Dwyer
ATTORNEY

INVENTORS:
Richard M. Bird
Ju C. Tu

By Joseph R. Dwyer
ATTORNEY

MULTIPLE MATCH RESOLVING NETWORK

Filed Feb. 19, 1968 5 Sheets-Sheet 5

INVENTORS:
Richard M. Bird
Ju C. Tu
By Joseph Dwyer
ATTORNEY

United States Patent Office 3,544,905
Patented Dec. 1, 1970

3,544,905

MULTIPLE MATCH RESOLVING NETWORK

Richard M. Bird, Glendale, and Ju C. Tu, Sylmar, Calif., assignors to General Precision Systems Inc., a corporation of Delaware Filed Feb. 19, 1968, Ser. No. 706,339
Int. Cl. H03k *19/00, 19/22, 5/20*
U.S. Cl. 328—92 3 Claims

ABSTRACT OF THE DISCLOSURE

The system is concerned with electronic data processing systems, and it comprises an improved multiple match resolving network which includes, for example, a logical tree or multiple gate type of network, and which may be quickly probed sequentially to select matching states from a group of multistate units.

BACKGROUND OF THE INVENTION

The multiple match resolving network of the invention finds particular application in conjunction with associative type memories. When such a memory is searched during a particular search mode, for example, certain multistate units, such as flip-flops, of a group in the word control electronics circuitry are set. The set flip-flops represent, for example, the words in the memory which matched a particular search characteristic. It is then desirable to provide appropriate control circuitry which has the capability of reading the contents of the matching words out of the memory, in a sequential manner, and as designated by the set flip-flops. The multiple match resolving networks to be described herein are ideally suited for that purpose.

However, the utility of the multiple match resolving network of the present invention is not limited to associative memories. The network of the invention has general utility is any application in which matching states are to be quickly and efficiently detected and selected from a group of multistate units.

For example, the multiple match resolving network of the invention may be used to serve additional functions. That is, it may be used to determine whether there are no matching states in a particular group of multistate units. Moreover, as will be described, it can be used to be determined when any specified number of matching states of the units exist.

Although the embodiments of the invention to be described herein deal with a particular number of words, it will be appreciated as the description proceeds that each of the networks to be described may be expanded to encompass any finite number of words.

The basic purpose of the network of the invention, as will be described, is immediately to locate in a sequential manner, and by a series of probing pulses, the flip-flops of a group which, for example, have been previously set to the logical "1" state. When the first flip-flop in that state is located by the first probing pulse, a signal is made available at the output of a circuit associated therewith, and the particular flip-flop is then reset to the logical "0" state. Then, each subsequent logical "1" matching flip-flop in the group is reached in sequence by successive probing pulses, and all the non-matching logical "0" flip-flops are skipped over. The probing pulses may continue until all the logical "1" matching flip-flop states have been determined and reset, at which time a particular gate in the network produces an output indicative of that condition.

DETAILED DESCRIPTION OF THE ILLUSTRATED EMBODIMENTS

Figure 1:
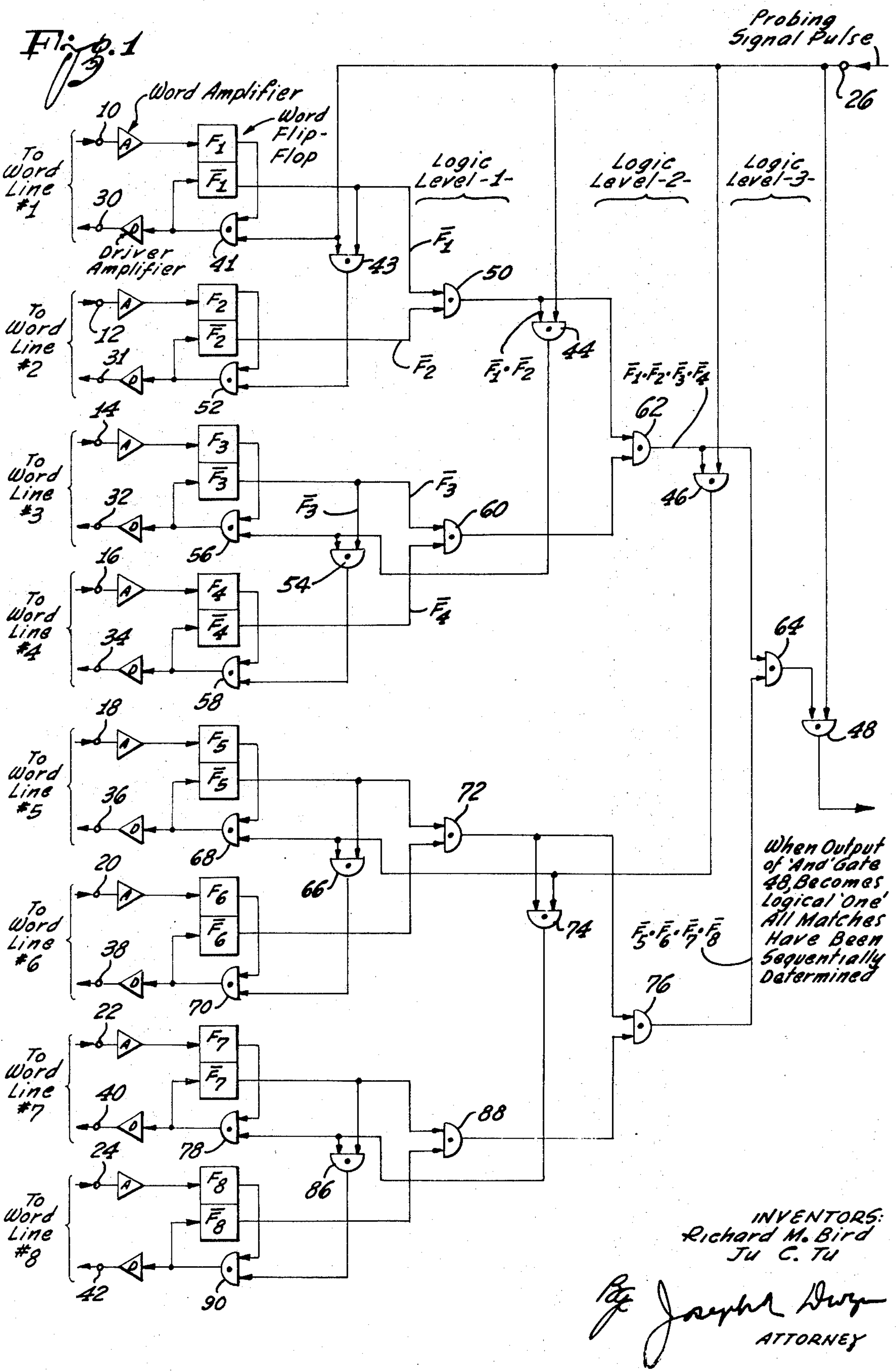
FIG. 1 is a particular multiple match resolving network of the logical tree type, and which is made up of dual input "and" gates exclusively, the network of FIG. 1 representing one embodiment of the invention.

The embodiment shown in FIG. 1 may be used, for example, with an associative memory, as mentioned above. When the associative memory is searched for a particular group of matching memory words, signals are impressed on each of the input terminals 10, 12, 14, 16, 18, 20, 22 and 24, of the network of FIG. 1, indicative of which ones of the eight memory words correspond to the particular search characteristic. As shown in FIG. 1, these terminals are connected through respective amplifiers designated A to the set input terminals of corresponding flip-flops F1, F2, F3, F4, F5, F6, F7 and F8. As pointed out previously, although the circuit of FIG. 1 is shown as utilized in conjunction with eight separate words, any finite number of words can be indicated by an appropriate modification of the circuit.

It will be appreciated that the flip-flops F1–F8 which are set in response to a particular search of the associative memory correspond to the words of the memory matching the search characteristics, as described above. The purpose of the embodiment of FIG. 1 is sequentially to select the set flip-flops of the group on an essentially immediate basis, ignoring the reset flip-flops; and then sequentially to produce an output from the circuits associated with the respective set flip-flops, so that the particular words which matched the search characteristics can be read sequentially out of the memory. For this purpose, a series of probing pulses are introduced to an input terminal 26, the first probing pulse serving to produce an output at the corresponding driver amplifier designated D associated with the first set flip-flop, while ignoring the reset flip-flops. The next probing pulse causes an output to appear at the output of the driver amplifier D associated with the next set flip-flop, and so on. These output pulses appear sequentially at the various ones of a group of output terminals 30, 31, 32, 34, 36, 38, 40 and 42 corresponding to the set flip-flops, and the pulses are used to cause the matching words to be read out of the memory on a sequential basis, as is desired.

To accomplish the results of the invention, the probing pulse input terminal 26 is connected to a pair of "and" gates 41 and 43, as well as to a plurality of further "and" gates 44, 46 and 48. It will be remembered that all the "and" gates included in the embodiment of FIG. 1 are two-input "and" gates.

The set output terminal of the flip-flop F1 is connected to the "and" gate 41, and the output terminal of the "and" gate 41 is connected to the associated driver amplifier D and to the reset input terminal of the flip-flop F1. The reset output terminal of the flip-flop F1 is connected to the "and" gate 43 and to a further "and" gate 50.

The reset output terminal of the flip-flop F2 is also connected to the "and' gate 50. The output of the "and" gate 43 is connected to a further "and" gate 52, as is the set output terminal of the flip-flop F2. The output of the "and " gate 52 is applied to the associated driver amplifier D and to the reset input terminal of the flip-flop F2.

The "and" gate 44 is connected to an "and" gate 54 and to an "and" gate 56. The set output terminal of the flip-flop F3 is connected to the "and" gate 56, and the output of the "and" gate 56 is applied to the associated driver amplifier D to the reset input terminal of the flip-flop F3.

The "and" gate 54 is connected to an "and" gate 58, as is the set output terminal of the flip-flop F4. The "and" gate 58 is connected to the associated driver amplifier D and to the reset input terminal of the flip-flop F4. The reset output terminal of the flip-flop F3 and the reset output terminal of the flip-flop F4 are connected to an "and" gate 60. The output of the "and" gate 50 and the output of the "and" gate 60 are connected to a further "and" gate 62, the output of the "and" gate 50 being further connected to the "and" gate 44. The output of the "and" gate 62 connects with the "and" gate 46 and with a further "and" gate 64.

The output of the "and" gate 46 is connected to an "and" gate 66 and to an "and" gate 68. The "and" gate 68 is connected to the driver amplifier associated with the flip-flop F5, and to the reset input terminal of the flip-flop F5. The set output terminal of the flip-flop F5 is connected to an input terminal of the "and" gate 68. The output of the "and" gate 66 is connected to an "and" gate 70, as is the set output terminal of the flip-flop F6. The "and" gate 70 is connected to the driver amplifier D associated with the flip-flop F6 and to the reset input terminal of the flip-flop F6.

The reset output terminal of the flip-flop F5 and the reset output terminal of the flip-flop F6 are both connected to an "and" gate 72. The output of the "and" gate 72 and the output of the "and" gate 46 are connected to a further "and" gate 74, the output of the "and" gate 72 being connected to a further "and" gate 76 whose output is connected to the "and" gate 64.

The output of the "and" gate 74 is connected to an "and" gate 78 and to an "and" gate 86. The set output terminal of the flip-flop F7 is connected to the "and" gate 78, while the output of the "and" gate 78 is connected to the driver amplifier associated with the flip-flop F7 and to the reset input terminal of the flip-flop F7. The reset output terminal of the flip-flop F7 is connected to the "and" gate 86 and to a further "and" gate 88. The output of the "and" gate 86 is connected to an "and" gate 90, as is the set output terminal of the flip-flop F8. The output of the "and' gate 90 is connected to the driver amplifier D associated with the flip-flop F8 and to the reset input terminal of the flip-flop F8. The reset output terminal of the flip-flop F8, as mentioned, is connected to the "and" gate 88 whose output, in turn, is connected to the "and" gate 76.

It will be apreciated that the first probe pulse applied to the input terminal 26 will reset the first set flip-flop of the group, immediately being applied to that flip-flop, and skipping the reset flip-flops. For example, assuming that the flip-flop F1 is reset, and the flip-flop F2 is set, the first probe pulse will pass through the "and" gates 43 and 52 to appear at the output of the driver ampilfier D associated with the flip-flop F2, and it will also reset the flip-flop F2. The reseting of the flip-flop F2 causes the "and" gate 50 to be enabled to produce an output, which enables the "and" gate 44.

Assume that the next set flip-flop is F4, the following probing pulse will be passed by the "and" gate 44, by the "and" gate 54, and by the "and" gate 58 to appear at the output of the driver amplifier D associated with the flip-flop F4. This pulse will also reset the flip-flop F4, so as to cause the "and" gates 60 and 62 to produce an output to enable the "and" gate 46. The operation of the circuit continues until all the flip-flops of the group which had matching logical "1" states are sequentially detected and returned to the logical "0" state. After all the matches have been sequentially determined, the "and" gate 48 produces an output to indicate that situation.

As described above, each matching (logical "1") flip-flop in the network of FIG. 1 is thus determined by skiping over the nonmatching (logical "0") flip-flops. The sequence of probing pulses, as mentioned, may be continued until all the matching states (logical "1") has been determined, and this is indicated when the output of the gate 48 becomes logical "1."

As previously pointed out, all the gates in the network of FIG. 1 are two-input "and" gates. For $n$ words, and $n$ flip-flops corresponding thereto $3n-1$ gates are required. In the worst case $2[(\log_2 n)+1]$ gate times are required to determine a single (logical "1") flip-flop. For M matching flip-flops, then, in the worst case $2M[(\log_2 n)+1]$ gate times are required to determine all M matching logical "1" states.

By comparison, the prior art sequential word-by-word networks require $2n$ two-input "and" gates, which is fewer than the network of FIG. 1; but the prior art networks require $2n$ gate times regardless of the number of matching (logical "1") flip-flops.

Figure 2:
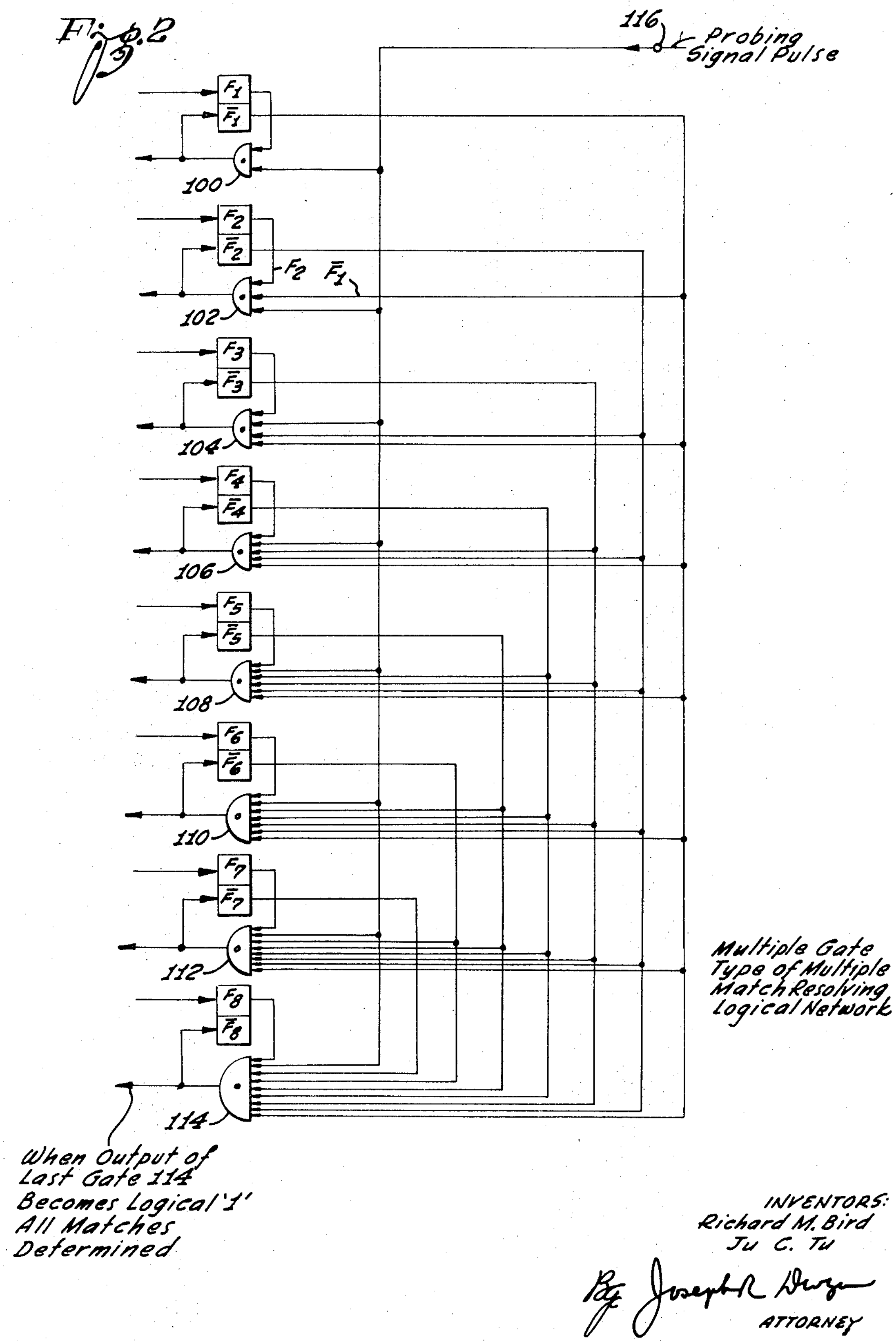
FIG. 2 is a multiple match resolving network of the multiple gate type, representing a second embodiment of the invention, and which includes multiple input "and" gates.

In the circuit of FIG. 2 the "worst case" gate time is further improved over that of FIG. 1. As indicated above, the network of FIG. 2 uses multiple input "and" gates. In the latter network, only one gate time is required to determine any one flip-flop in the logical "1" state, or M gate times are required to determine M flip-flops in the logical "1" state. The circuit of FIG. 2 may be used in the same environment as that of FIG. 1, however, certain of the driver amplifiers and word amplifiers have been omitted from FIG. 2 since duplication thereof is believed to be unnecessary.

The network of FIG. 2 includes a two-input "and" gate 100 associated with the flip-flop F1; a three-input "and" gate 102 associated with the flip-flop F2; a four-input "and" gate 104 associated with the flip-flop F3; a five-input "and" gate 106 associated with the flip-flop F4; a six-input "and" gate 108 associated with the flip-flop F5; a seven-input "and" gate 110 associated with the flip-flop F6; an eight-input "and" gate 112 associated with the flip-flop F7; and a nine-input "and" gate 114 associated with the flip-flop F8.

The probing signal pulses are applied to the network by way of an input terminal 116, and these pulses are applied to all the "and" gates. The set output terminal of each flip-flop is connected to an input terminal of its associated "and" gate, and the reset output terminals of all the preceding flip-flops are connected to respective ones of the "and" gates associated with the different flip-flops. The outputs of the "and" gates are connected to the corresponding output terminals, and also to the reset input terminals of the various flip-flops.

It will be appreciated that any one of the "and" gates is enabled, only when the flip-flop corresponding thereto is in a matching (logical "1") state, and only when all the preceding flip-flops are in the logical "0" state. Therefore, each probing signal pulse effectively skips the flip-flops which are in the logical "0" state, and sequentially determines the flip-flops in the logical "1" state. As in the previous embodiment, each time a logical "1" state flip-flop is determined, its associated "and" gate produces an output pulse which also serves to return the corresponding flip-flop to its reset state. When all the flip-flops in the matching logical "1" states have been determined, and "and" gate 114 produces a logical "1" output indicative of that condition.

Figure 3:
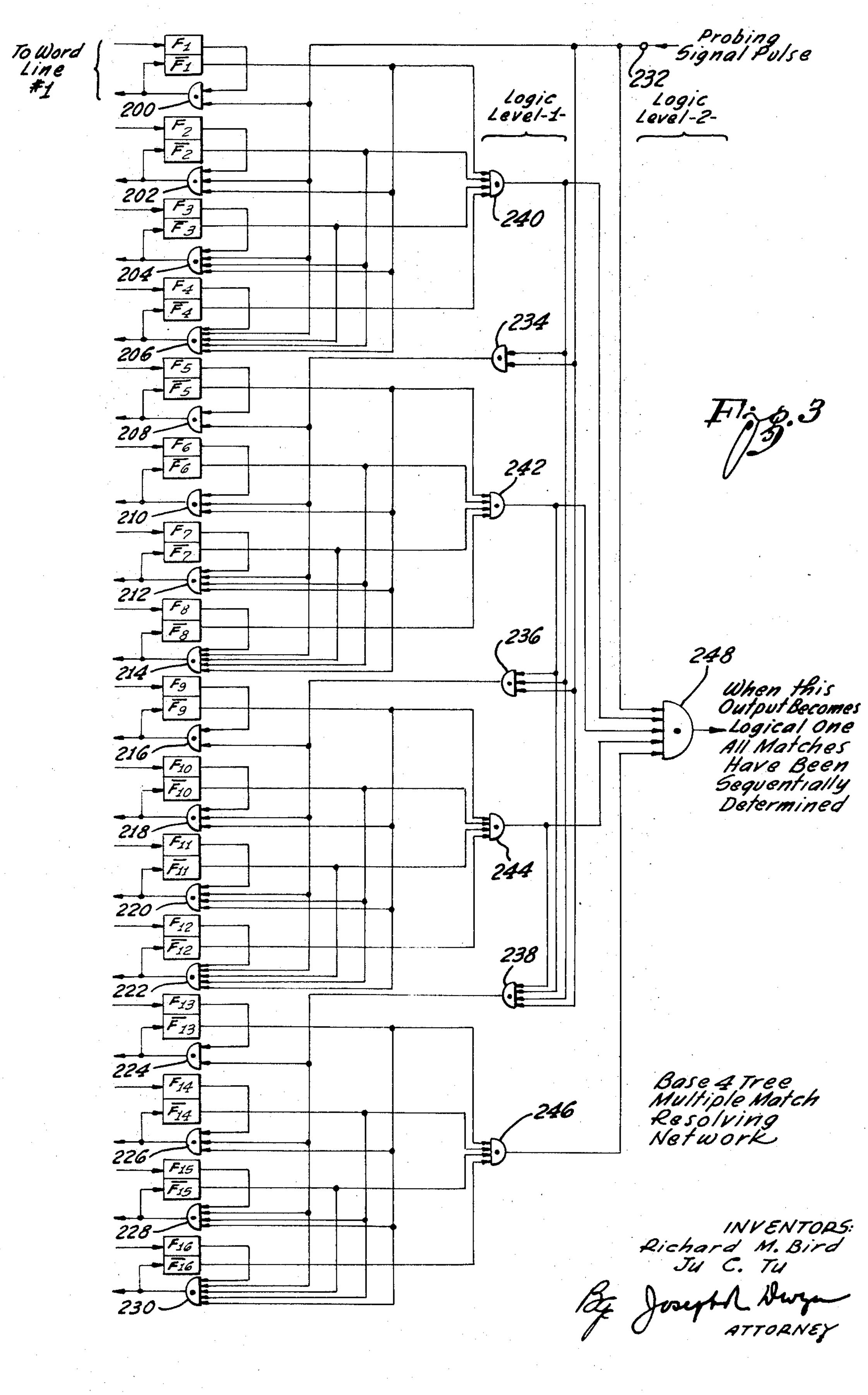
FIG. 3 is yet another embodiment of the invention, and is essentially a combination of the embodiments of FIGS. 1 and 2.

It will be appreciated that the network of FIG. 2 becomes impractical when a large number of flip-flops are to be determined. This is due to the increased number of inputs which must be handled by each successive "and" gate in the network. However, the binary tree concept of FIG. 1 may be combined with the multiple input gate concept of FIG. 2, as shown in FIG. 3, to take advantage of the favorable aspects of both networks, so that the propagation delay may be reduced as much as possible without requiring "and" gates of excessively high numbers of inputs.

The binary (or number base 2) tree of FIG. 1 for example, can be expanded to any number base. In the network of FIG. 3 it is expanded to a number base 4. In the network, sixteen flip-flops designated F1–F16 are included. These flip-flops are grouped into four groups, with four flip-flops in each group.

A first set of "and" gates 200, 202, 204 and 206 are associated with the flip-flops F1–F4. A second group of "and" gates 208, 210, 212, 214 are associated with the flip-flops F5–F8. A third group of "and" gates 216, 218, 220 and 222 are associated with the flip-flops F9–F12. A fourth group of "and" gates 224, 226, 228 and 230 are associated with the flip-flops F13–F16. It will be observed that the "and" gates of each group are respectively two-input, three-input, four-input and five-input "and" gates. Also, the set output terminal of each flip-flop is connected to the associated "and" gate, whereas the reset output terminals of all preceding flip-flops in each group are connected to the subsequent "and" gates in that group.

The probing signal pulses in the latter network are applied to a terminal 232. The terminal 232 is directly connected to the "and" gate 200, 202, 204 and 206 of the first group, and it is connected to a group of "and" gates 234, 236 and 238. The "and" gate 234 is connected to the "and" gates 208, 210, 212 and 214 of the second group; the "and" gate 236 is connected to the "and" gates 216, 218, 220 and 222 of the third group; and the "and" gate 238 is connected to the "and" gates 224, 226, 228 and 230 of the fourth group.

The reset output terminals of all the flip-flops of the first group are connected to an "and" gate 240; the reset output terminals of all the "and" gates of the second group are connected to an "and" gate 242; the reset output terminals of all the flip-flops of the third group are connected to an "and" gate 244; and the reset output terminals of all the flip-flops of the fourth group are connected to an "and" gate 246. The "and" gates 240, 242, 244 and 246 are all connected to a further "and" gate 248, as is the input terminal 232.

It will be appreciated that when a probing pulse is applied to the input terminals 232, none of the flip-flops of any of the groups, other than the first group, can be determined until the states of all the flip-flops of the first group have been determined, and the flip-flops have been set to their logical "0" state. Therefore, insofar as the individual groups are concerned, the circuit functions in a manner similar to the circuit of FIG. 2. However, insofar as the successive groups are concerned, the network of FIG. 3 functions in a manner similar to the network of FIG. 1. When all the logical "1" state flip-flops in the network of FIG. 3 have been determined, the "and" gate 248 produces a logical "1" at its output, indicative of the situation With respect to networks such as shown in FIG. 3, if $b$ represents the number base; then gates with $b+1$ inputs are required in the worst case. Now let $n$ represent the total number of words, and define $k$ as follows:

$$k=\log_b n$$

integer (or next larger integer for nonintegers); and if $g_T$ is the total number of gates required, then:

$$g_T \leq n+\sum_{i=1}^{k} 2b^{k-1}-1$$

In the worst case, the total gate delay $g_d$ per interrogation is:

$$g_d=2k-1$$

gate times or for M matching flip-flops, the total time $T_M$ required to determine all the matching flip-flops would be:

$$T_M=M(2k-1)$$

With transistor logic, "and" gates are often not as readily available as are "nand" and "nor" gates. One could use the "nand" gates and then invert the outputs by logical inverters in the circuits of FIGS. 1–3. However, the network of the present invention may be modified so as to utilize "nand" and "nor" gate combinations on a more efficient basis. For instance, if the logical level $k$ is even, then proper result can be obtained by beginning with a "nand" gate and the true value of the function, and ending in a "nor" (∓) gate as is shown for a two-level network in the circuit of FIG. 4.

Figure 4:
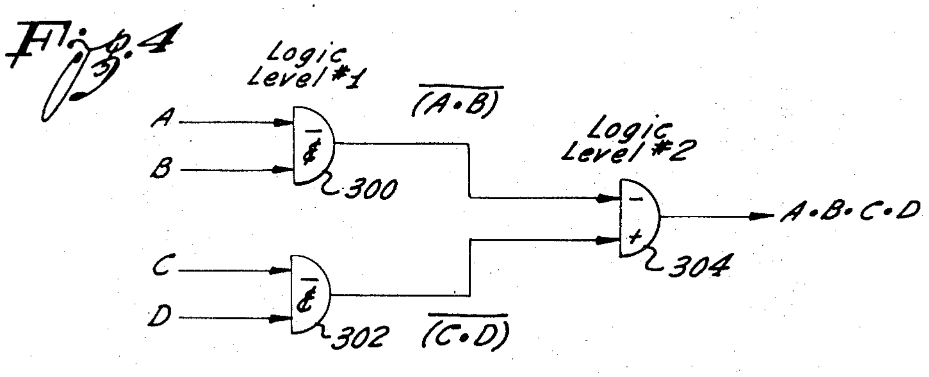
FIG. 4 is a logic diagram representing a type of "nor" gate and "nand" gate logic to be used in a subsequent embodiment.

As shown in FIG. 4, terms A and B are introduced to a "nand" gate 300, and the terms C and D are introduced to a "nand" gate 302. The terms $(\overline{A}\cdot\overline{B})$ and $(\overline{C}\cdot\overline{D})$ appear at the outputs of the "nand" gates, and these are applied to a "nor" gate 304 to produce the output A·C·D.

Figure 5:
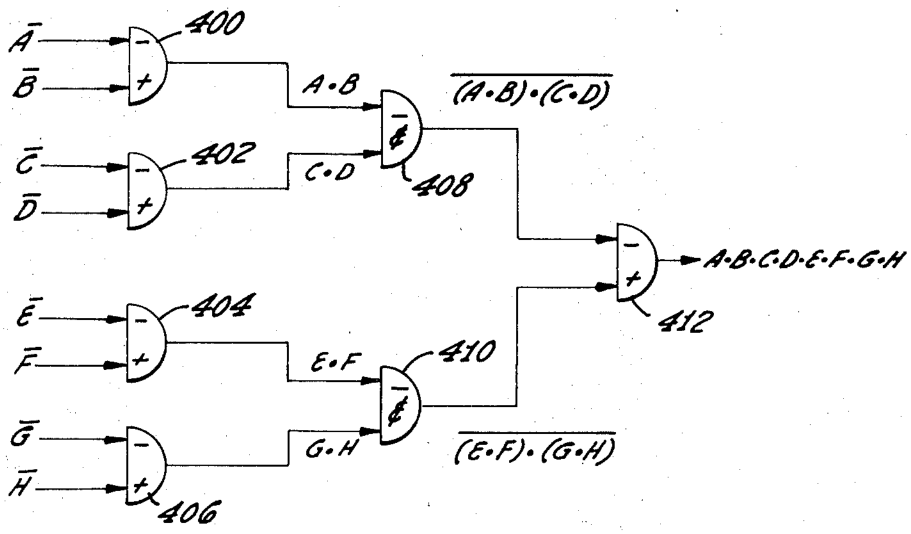
FIG. 5 likewise is a logical diagram also showing the "nor" gates and the "nand" gate logic to be used in the subsequent embodiment.

If the logic level $k$ is odd, then the proper result can be obtained by beginning with a "nor" gate and the false value of the function then ending in a "nor" gate as is shown, for example, in the network of FIG. 5. In FIG. 5, the terms $\overline{A}$ and $\overline{B}$ are applied to a "nor" gate 400, and the terms $\overline{C}$ and $\overline{D}$ are applied to a "nor" gate 402. The terms $\overline{E}$ and $\overline{F}$ are applied to a "nor" gate 404, and the terms $\overline{G}$ and $\overline{H}$ are applied to a "nor" gate 406.

The "nor" gate 400 produces an output A·B, and the "nor" gate 402 produces an output C·D. These outputs are applied to a "nand" gate 408. Likewise, the "nor" gate 404 produces an output E·F and the "nor" gate 406 produces an output G·H, and these latter outputs are applied to a "nand" gate 410. The "nand" gate 408 produces an output $(\overline{A}\cdot\overline{B})\cdot(\overline{C}\cdot\overline{D})$; and the "nand" gate 410 produces an output $(\overline{E}\cdot\overline{F})\cdot(\overline{G}\cdot\overline{H})$. These latter outputs are applied to a "nor" gate 412 which produces the desired output A·B·C·D·E·F·G·H.

The aforesaid networks of FIGS. 4 and 5 are illustrated with two-input gates. However, identical results may be obtained regardless of the number of inputs. Therefore, the gates in the forward patch (diminishing gate) of the tree multiple match resolving network can always be replaced, gate for gate, by "nor/nand" gate combinations. However, in the gate network going in the other direction, it is sometimes necessary to provide for inversion of the logic function as will appear in FIG. 6. Therefore, a few more gates are required in the latter instance than are required for the all "and" gate network. In this direction, the gate circuitry below the flip-flop must always be a "nor" gate. The output from the flip-flops preceding any particular flip-flop must be the complement of the value when compared with the all "and" gates. However, as far as the worst case, total gate delay per interrogation $g_d$ is concerned, if the logic level $k$ is odd, the $g_d$ is the same as for the all "and" network. That is, $g_d=2k-1$. However, if $k$ is even, one more gate time is required, or $g_d=2k$. As an example of the network for a base number 4 tree for sixteen words, reference is made to the network of FIG. 6.

Figure 6:
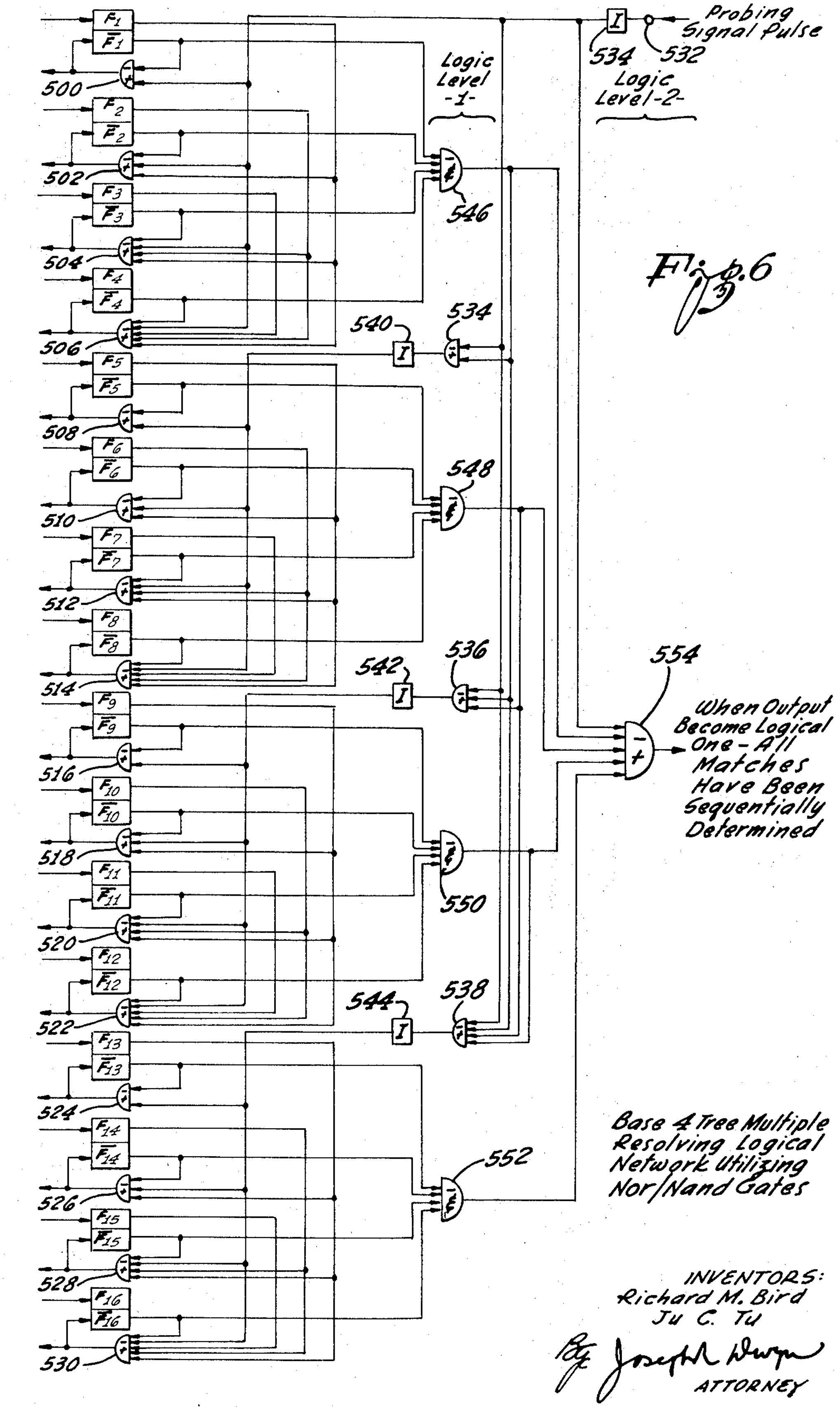
FIG. 6 is a multiple match resolving network representing a further embodiment of the invention and utilizing the "nor" gates and "nand" gate logic described in conjunction with FIGS. 4 and 5.

The network of FIG. 6, like the network of FIG. 3, includes four groups of flip-flops, of four flip-flops each. In the circuit of FIG. 6, however, "nand" gates and "nor" gates are used, together with inverters, in some instances. As mentioned above, the reason for the replacement of the "and" gates of FIG. 3 with the "nor" and "nand" gates of FIG. 6, is the more readily availability of the latter gates.

In the network of FIG. 6, a series of "nor" gates 500, 502, 504, 506, 508, 510, 512, 514, 516, 518, 520, 522, 524, 526, 528 and 530 are associated with the various flip-flops in the various groups. The reset output terminal of each flip-flop is connected to its associated "nor" gate, and the output terminals of all the preceding flip-flops in each group is also connected to the associated "nor" gates in the group, as shown.

The probing signal pulses are introduced by way of an input terminal 532 through an inverter 534. These pulses are applied to the "nor" gates 500, 502, 504 and 506 of the first group, and to additional "nor" gates 534, 536 and 538. The latter "nor" gates are connected through respective inverters 540, 542 and 544 to the individual "nor" gates in the other three groups.

The reset output terminals of the flip-flops of the first group are all connected to a "nand" gate 546; the reset output terminals of all the flip-flops of the second group are connected to a "nand" gate 548; the reset output terminals of all the flip-flops of the third group are connected to a "nand" gate 550; and the reset output terminals of all the flip-flops of the fourth group are connected to a "nand" gate 552. The "nand" gates 546, 548, 550 and 552 are all connected to a further "nor" gate 554, as is the inverter 534. The "nand" gates are also connected to the "nor" gates 534, 536 and 550 as shown in FIG. 6.

The network of FIG. 6 operates in a manner similar to that of FIG. 3, and in accordance with the logic explanation given in conjunction with FIGS. 4 and 5. In the latter network, when all the matching state "1" flip-flops have been determined, the output of the "nor" gate 554 becomes a logical "1."

As mentioned above, the logical networks of the network can be used to serve functions in addition to determining the matching (logical "1") states. For example, and as pointed out above, the networks can be used to determine whether there are no matching (logical "1") states. This indication is made when the first probing signal pulse applied to the particular network causes the output gate in that network, such as the gate 48 in FIG. 1; the gate 114 in FIG. 2; the gate 248 in FIG. 3; or the gate 554 in FIG. 6; to produce a logical "1" state. When this occurs, it is evident that there were initially no matching logical "1" states in the corresponding network.

In addition, the networks can be used to determine when any specified number of matching states exist. This latter utilization requires a counter such as shown in FIG. 7.

Figure 7:
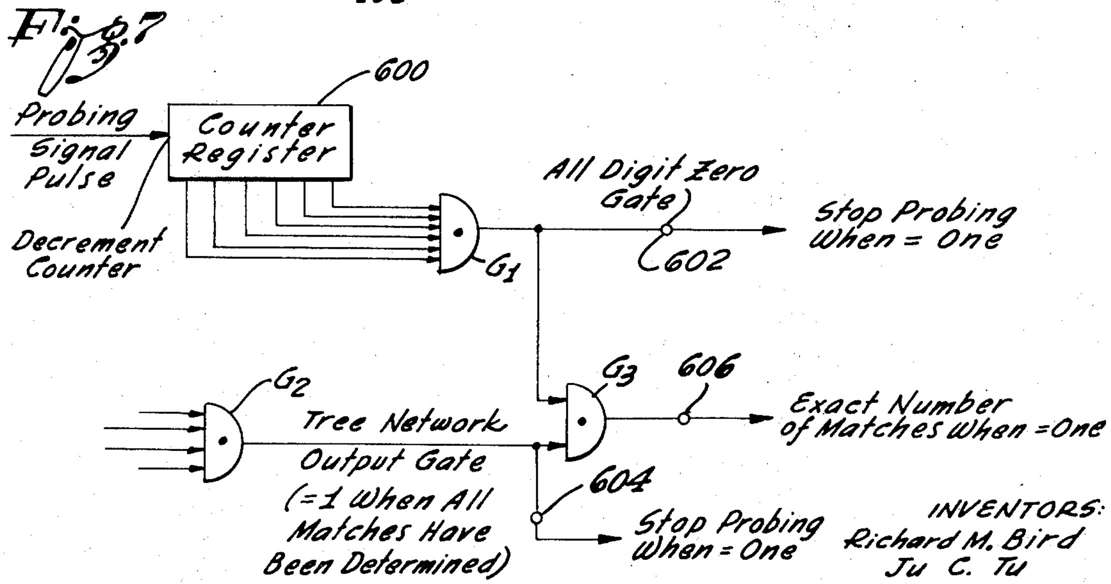
FIG. 7 is a counter network used to indicate the number of matching states encountered by the resolving network of the invention.

In the circuit of FIG. 7, the probing signal pulses are applied to a binary counter register 600, and each successive pulse causes the register to assume a different state. The number of matches desired are initially loaded into the counter 600, so that each step of the counter by the probing signal pulse causes it to decrement toward zero. The outputs of the counter register are connected to an "and" gate G1, and it produces an output when the counter 600 has been counted to zero. When that output is produced, then signal appearing at the output terminal 602, for example, causes the probing to stop.

The gate G2 in FIG. 7 represents the aforesaid output gates 48, 114, 248, 554 of the corresponding network of FIGS. 1, 2, 3, 6, and when that gate produces an output, the indication is that all the matching state (logical "1") flip-flops have been determined. The output from the latter gate G2 produces a corresponding output at the output terminal 604 which, likewise, causes the probing to stop. If the probing is stopped by the output from the gate G2 first, then there are fewer matches than desired. If the probing stops on the output of the gate G1 first, then there are more matches than desired. If the stopping occurs on the outputs of the gates G1 and G2 simultaneously, then there are exactly the number of matches desired, this being indicated by an output from the gate G3 at an output terminal 606.

It will be appreciated, therefore, that the present invention provides an improved multiple matching resolving network which is constructed so that the time required to detect and determine the matching state is optimized, as compared with the usual prior art networks of this general type. Also, it will be appreciated from the various embodiments, that the concept of the invention is flexible and may take several separate embodiments, or combined embodiments, depending upon the number of words involved in any particular system.

Therefore, it will also be appreciated that although particular embodiments have been illustrated and described, there are equivalents that may be used without departing from the spirit and scope of the invention. The following claims are intended to cover all such embodiments as come within the invention.

We claim:

1. A multiple match resolving network including: a series of input terminals; a corresponding series of multistate units each having a first input terminal connected to a corresponding one of said first-named input terminals to be set to a first state upon the receipt of an input signal on the aforesaid corresponding input terminal and each having an output terminal; and a series of output terminals corresponding to respective ones of said multistate units; a probing signal input terminal for receiving successive probing pulses; and logic circuitry coupling said probing signal input terminal to said output terminals and to the output terminals of said multistate units so as to pass a probing signal pulse to a corresponding one of the output terminals of said series when the multistate unit corresponding thereto is in its first state and when all the preceding multistate units in said series are in a second state, and in which each of said multistate units includes a second input terminal and said logic circuitry includes circuits connected to the second input terminals of said multistate units to reset the individual multistate units of said series to said second state whenever a probing pulse is passed to the output corresponding thereto, and in which said logic circuitry is a multiple gate type composed of a series of "and" gates of progressively increasing numbers of input terminals.

2. The multiple match resolving network defined in claim 1 and which includes a gate included in said logic circuitry and providing an output when all the multistate units having been set to said first state have been determined.

3. The multiple match resolving network defined in claim 1 and which includes a counter network responsive to said probing pulses for providing an indication as to how many of the said multistate units were in said first state.

References Cited

UNITED STATES PATENTS

| | | | |
|---|---|---|---|
| 2,840,705 | 6/1958 | Scully | 328—104 |
| 3,113,273 | 12/1963 | Tendick | 328—92X |

DONALD D. FORRER, Primary Examiner

J. ZAZWORSKY, Assistant Examiner

U.S. Cl. X.R.

307—231; 328—94, 97, 152